United States Patent
Ando et al.

(10) Patent No.: US 6,922,040 B2
(45) Date of Patent: Jul. 26, 2005

(54) PWM SWITCHING REGULATOR WITH CURRENT AND VOLTAGE FEEDBACK

(75) Inventors: Hiroaki Ando, Kyoto (JP); Taichi Hoshino, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 18 days.

(21) Appl. No.: 10/667,946

(22) Filed: Sep. 22, 2003

(65) Prior Publication Data

US 2004/0070381 A1 Apr. 15, 2004

(30) Foreign Application Priority Data

Sep. 30, 2002 (JP) ........................................ 2002-285016

(51) Int. Cl.[7] ................................................. G05F 1/70
(52) U.S. Cl. ......................... 323/224; 323/285; 323/288
(58) Field of Search ................................ 323/224, 285, 323/288, 286

(56) References Cited

U.S. PATENT DOCUMENTS 6,194,875 B1 * 2/2001 Takimoto et al. ........... 320/164
6,724,174 B1 * 4/2004 Esteves et al. .............. 323/224
6,828,766 B2 * 12/2004 Corva et al. ................ 323/284

FOREIGN PATENT DOCUMENTS

JP              7-55055           6/1995

* cited by examiner

*Primary Examiner*—Shawn Riley
(74) *Attorney, Agent, or Firm*—Merchant & Gould P.C.

(57) ABSTRACT

In a switching power source apparatus which outputs a DC output voltage converted from a DC power source voltage, the DC output, voltage is compared with a reference voltage to generate a feedback signal which decreases as the DC output voltage increases. A current detecting signal which decreases as the output current increase is also generated. The smaller of the feedback signal and the current detecting signal, as a comparison signal, is compared with a triangular signal in a PWM comparator to produce a PWM signal. A semiconductor switch is on-off controlled by the PWM signal. Therefore, the apparatus can perform a constant voltage control with a current limit function.

3 Claims, 3 Drawing Sheets

PWM SWITCHING REGULATOR WITH CURRENT AND VOLTAGE FEEDBACK

BACKGROUND OF THE INVENTION

1. Field of the Invention

This invention relates to a switching power source apparatus for DC—DC conversion which performs a constant voltage control with a current limit function.

2. Description of the Related Art

Conventionally, a current limit by pulse-by-pulse method has been adopted for many switching power sources which perform the constant voltage control with a function of the current limit.

FIG. 5 is a view showing the configuration of a conventional switching power source for constant voltage control which performs the current limit by the pulse-by-pulse method.

As seen from FIG. 5, between a power source voltage VCC and ground, a current detecting resistor 51, a high-side switch 52 which is an NMOS transistor (hereinafter, referred to "NMOS"), and a low-side switch 53 which is an NMOS are connected in series. From a connecting point of the high side switch 52 and the low side switch 53, an output voltage Vout is produced through a smoothing coil 54 and a smoothing capacitor 55. Reference numeral "60" denotes an IC for a regulator.

The output voltage Vout is fed back to an error amplifier 61, and compared with a reference voltage Vref1. A feedback voltage FB, which is an error output, is produced from the error amplifier 61. The feedback voltage FB and a triangular wave signal supplied from a triangular wave oscillator 62 are compared by a PMW comparator 63 to create a PWM signal. The PWM signal, after passed an AND circuit 64, becomes a gate driving signal P1 through a driver 65. The gate driving signal P1 is supplied to the gate of the high side switch 52. The PWM signal, after passed the AND circuit 64, also becomes a gate driving signal P2 through a delay circuit 66 and an inverting driver 67. The gate driving signal P2 is supplied to the gate of the low side switch 53.

By the gate driving signal P1 and gate driving signal P2, the high-side switch 52 and the low-side switch 53 are alternately turned on and off. The on/off time width is automatically adjusted by PWM control to produce a preset output Vout.

On the other hand, for the purpose of a current limit operation, the detecting resistor voltage ΔV due to the current I flowing through the current detecting resistor 51 is always monitored. The detecting resistor voltage ΔV is compared with a reference voltage Vref2 in a comparator 68. If the current I is smaller than a prescribed limited current, the detecting resistor voltage ΔV is smaller than the reference voltage Vref2 (ΔV<Vref2). In this case, the output from the comparator 68 is at a high (H) level so that the AND circuit 64 permits the PWM signal to pass.

If the current I exceeds the prescribed limited current, the detecting resistor voltage ΔV is larger than the reference voltage Vref2 (ΔV>Vref2). In this case, the output from the comparator 68 is at a low (L) level so that the AND circuit 64 does not permit the PWM signal to pass. As a result, the high-side switch 52 is turned off and the low-side switch 53 is turned on, thereby limiting the current I.

In some voltage PWM inverters, the output current is monitored to reduce a set voltage value when the output current exceeds a prescribed value.

JP-B-H7-55055 is known as a related art.

In a conventional switching power source apparatus for constant voltage control which performs the current limit by the pulse-by-pulse method, since the current is detected with using the detecting resistor voltage ΔV generated in the current detecting resistor 51 due to the current, the gate driving signal P1 must be stopped while the high-side switch 52 is ON.

The delay time from when the detecting resistor voltage ΔV exceeds the reference voltage Vref2 to when the gate driving signal P1 actually stops exerts an influence on the accuracy of current limit to deteriorate the accuracy as the delay time increases. In addition, due to the pulse-by-pulse method, the influence by the delay occurs repeatedly during each pulse cycle. Therefore, in order to carry out the current limit with high accuracy, a high speed comparator 68 (having e.g. a response of about several ns (nano seconds)) is required and further the delay time of the driver 65 must be decreased. However, it is difficult to implement the high speed operation of these comparator 68 and driver 65.

Further, since passage or block of the PWM signal is controlled by using the output from the comparator 68, the output voltage is likely to be unstable by the switching operation at the time of current limit.

SUMMARY OF THE INVENTION

The object of the invention is to provide a switching power source apparatus for performing a constant voltage control with a current limit function, which can improve the accuracy of a current limit operation, can eliminate the need of a special high speed operation of a current detecting circuit and a driver, and can stabilize the output voltage during the current limit operation. Another object of the invention is to provide a switching power source apparatus for performing a constant voltage control with a current limit function, which can make a response of current limitation at a high speed.

The invention provides a switching power source apparatus having: a switching output circuit for outputting a DC output voltage converted from a DC power source voltage by a semiconductor switch which is on-off controlled; an error amplifying means for comparing the DC output voltage with a reference voltage to generate a feedback signal which decreases as the DC output voltage increases; a current detecting circuit for detecting an output current flowing through the switching output circuit to generate a current detecting signal which decreases as the output current increases; and a PWM comparator, to which the feedback signal and the current detecting signal are inputted as comparison signals and a triangular wave signal is inputted as a reference signal, for comparing a lower signal of the comparison signals and the triangular wave signal to output a PWM signal, wherein the semiconductor switch is on-off controlled by the PWM signal.

Furthermore, the current detecting signal is outputted through a low-pass filter.

Furthermore, the low-pass filter includes: a resistor provided between an input side and an output side; a capacitor between the output side and a reference point; and a semiconductor switch for charge discharging, which is connected in parallel to the capacitor, to be turned on when a voltage on the input side becomes lower than a voltage on the output side.

DETAILED DESCRIPTION OF THE PREFERRED EMBODIMENTS

Figure 1:
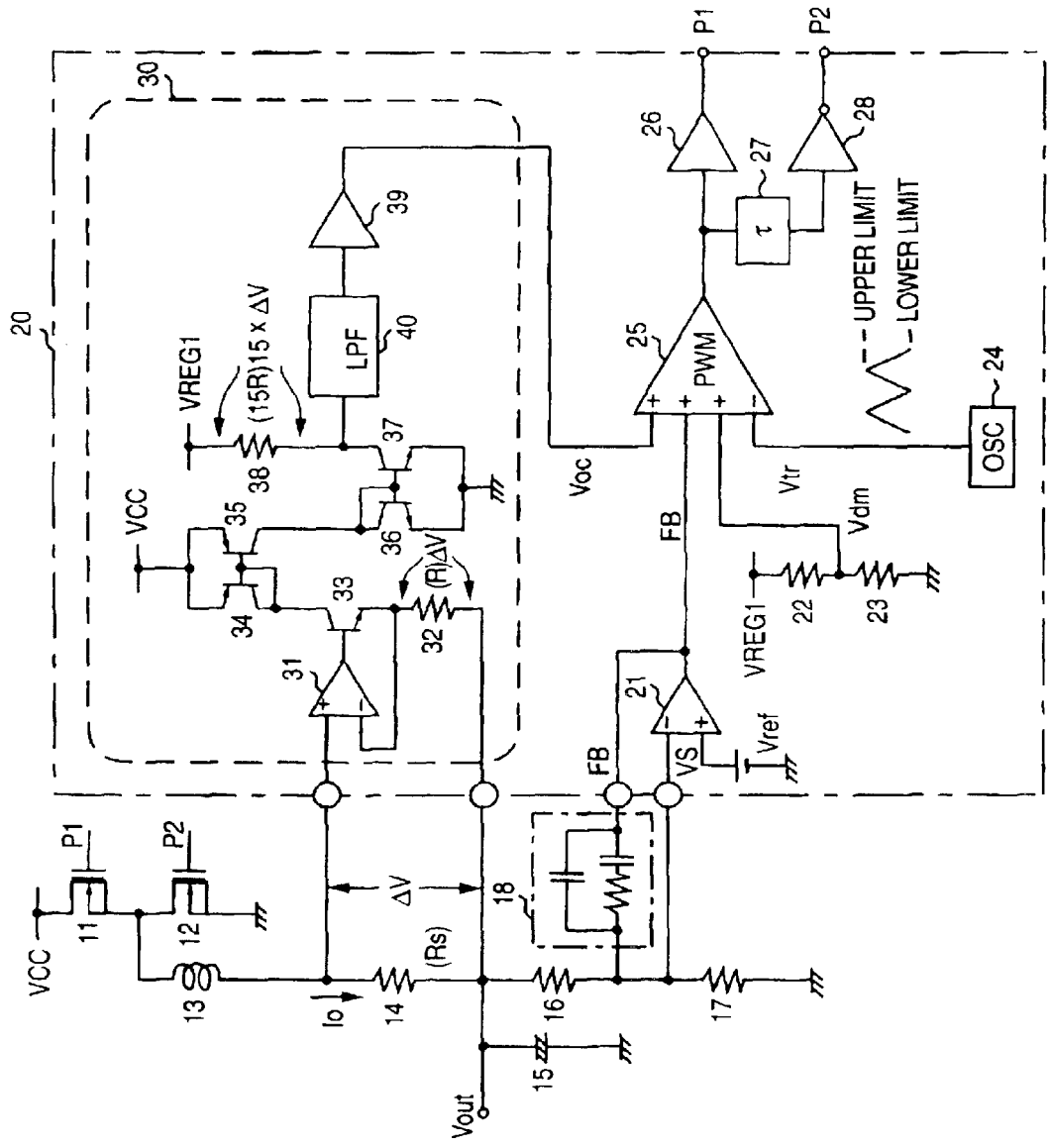
FIG. 1 is a view showing the arrangement of a switching power source apparatus according to an embodiment according to this invention.

Now referring to the drawings, an explanation will be given of a embodiment of the invention.

Figure 2:
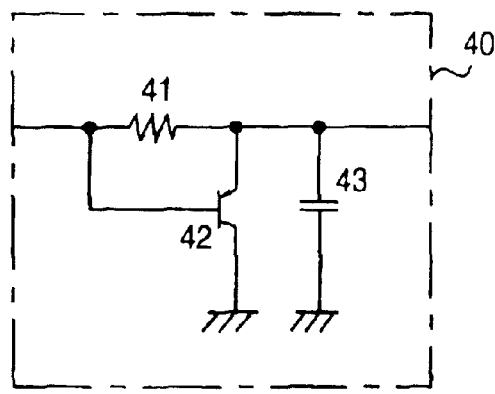
FIG. 2 is a view showing a low-pass filter employed in FIG. 1.
Figure 3:
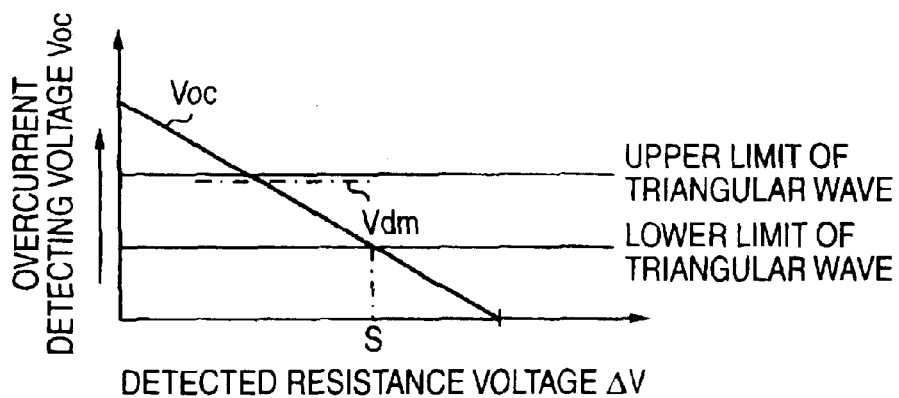
FIG. 3 is a view for explaining the current limit operation.
Figure 4:
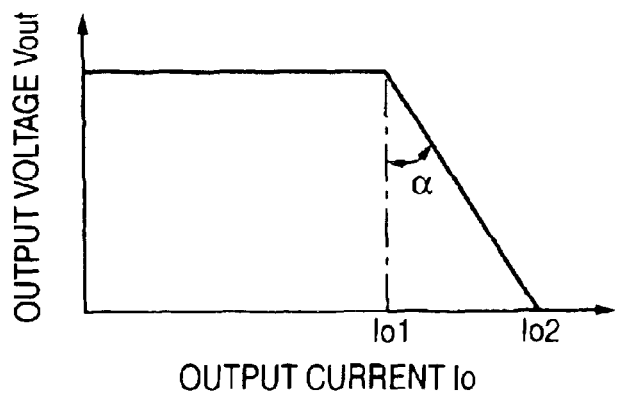
FIG. 4 is a view showing the characteristic of the output voltage versus the output current in the switching power source apparatus shown in FIG. 1.
Figure 5:
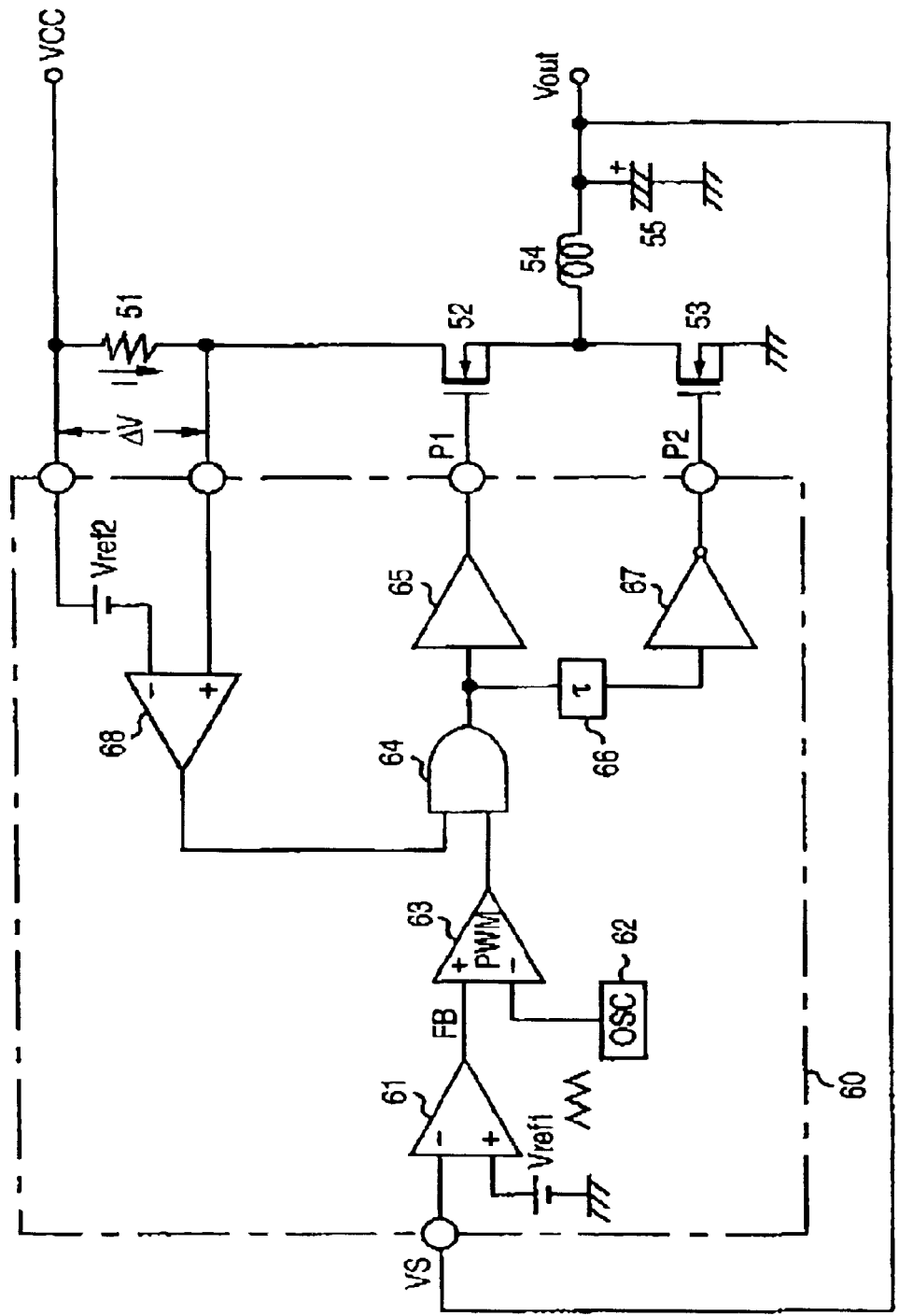
FIG. 5 is a view showing the arrangement of the conventional switching power source apparatus for constant voltage control with current limitation.

FIG. 1 is a view showing the configuration of a switching power source apparatus according to an embodiment of this invention. FIG. 2 is a view showing the configuration of a low-pass filter used in FIG. 1. FIG. 3 is a view for explaining the current limit function of the switching power source apparatus in FIG. 1. FIG. 4 is a graph showing the characteristic of an output voltage versus an output current.

As shown in FIG. 1, a high-side switch (first switch) 11 which is an NMOS transistor (hereinafter, referred to "NMOS") and a low-side switch (second switch) 12 which is an NMOS are connected in series between a power source voltage VCC and ground. From a connecting point of the first switch 11 and the second switch 12, an output voltage Vout is produced through a smoothing coil 13 and a current detecting resistor 14 (resistance Rs). The output voltage Vout is further smoothed by a smoothing capacitor 15.

The output voltage Vout is divided by voltage dividing resistors 16 and 17 to generate a detected voltage VS. The detected voltage VS is applied to an inverting input terminal (−) of an error amplifier 21 in an IC 20 for a regulator, and compared with a reference voltage Vref applied to a non-inverting input terminal (+). The output from the error amplifier 21 is connected to the voltage dividing point of the voltage dividing resistors 16 and 17 through a feedback circuit 18 which includes a resistor and a capacitor. The output voltage from the error amplifier 21 is a feedback voltage FB.

A triangular wave signal Vtr which serves as a reference signal for PWM control is produced from a triangular wave oscillator 24. The triangular wave signal Vtr is compared with a comparison signal between an upper limit (e.g. 1.95 V) and a lower limit (e.g. 1.45 V) of the triangular wave signal. The triangular wave signal may be a saw-tooth triangular wave signal.

Voltage dividing resistors 22 and 23 are provided between a reference voltage VREG1 and ground. From the voltage dividing point, a maximum duty setting voltage Vdm in PWM control is produced. This setting voltage Vdm is one of comparison signals. The maximum duty is preferably set at 85% (1.875 V in terms of the voltage).

Further, in this embodiment, an overcurrent detecting voltage Voc is employed as one of the comparison signals for PWM control. The comparison signals described above, i.e. the overcurrent detecting voltage Voc, the feedback voltage FB and the set voltage Vdm are applied to the plus (+) input terminal of the PWM comparator 25, whereas the reference signal, i.e. triangular wave signal Vtr is applied to the minus (−) input of the PWM comparator 25. The triangular wave signal Vtr and the signal with the lowest value of the three comparison signals are compared with each other in the PWM comparator 25. The PWM comparator 25 produces a PWM signal which is the result of the comparison.

The reference voltage VREG1 (e.g. 2.5 V) and the reference voltage Vref (e.g. 1.0 V) are created by a bandgap constant voltage circuit since they must be stabilized voltages.

The PWM signal produced from the PWM comparator 25 passes through a driver 26 to provide a gate driving signal P1. The gate driving signal P1 is supplied to the gate of the first switch 11. The PWM signal also passes through a delay circuit 27 for preventing a passing current and an inverting driver 28 to provide a gate driving signal P2. The gate driving signal is supplied to the gate of the second switch 12.

The overcurrent detecting voltage Voc which is one of the comparison signals for PWM control is created by an overcurrent detecting block 30.

The non-inverting terminal (+) of an operational amplifier 31 is connected to the one end of the current detecting resistor 14 on the side of the power source, whereas the inverting terminal (−) of the operational amplifier 31 is connected to another end of the current detecting resistor 14 through a resistor 32 (resistance R). The output terminal of the operational amplifier 31 is connected to the base of an NPN transistor (hereinafter, referred to "NPN") 33. A PNP transistor (hereinafter, referred to "PNP") 34, NPN 33 and a resistor 32 are connected in series between the power source voltage VCC and said another end of the current detecting resistor 14. The base and collector of the PNP 34 are connected to each other, and the base of the PNP 34 and the base of the PNP 35 are connected to each other to constitute a current mirror.

A PNP 35 and an NPN 36 are connected in series between the power source voltage VCC and ground. The collector and base of the NPN 36 are connected to each other, and the base of the NPN 36 and the base of PNP 37 are connected to each other to constitute a current mirror.

A resistor 38 (resistance 15R) and NPN 37 are connected in series between the reference VREG1 and ground. The resistance of the resistor 38 is set at a value 15 times as large as that of the resistor 32.

The overcurrent detecting voltage Voc is produced from the connecting point of the resistor 38 and NPN 37 through a low pass filter 40 and a buffer 39. The low pass filter 40 serves to smooth the input side voltage which pulsates according to the pulsating of the output current Io. Thus, the overcurrent detecting voltage Voc is constant under normal conditions, and even when the output current slightly varies, the overcurrent detecting voltage Voc varies smoothly.

In the overcurrent detecting block 30, when the output current Io flows through the current detecting resistor 14 to generate the detecting resistance voltage ΔV (=Rs×Io), the operational amplifier 31 operates so that the voltage difference between the two inputs becomes zero. Therefore, the same detecting resistance voltage ΔV is generated across the resistor 32. In order to generate the detecting resistance voltage ΔV, the current, which is obtained by dividing the detecting resistance voltage ΔV by the resistance R, flows through the NPN 33 and the PNP 34.

Since the PNP 34 and the PNP 35, and the NPN 36 and the NPN 37 respectively constitute current mirrors, a voltage drop "15×ΔV" is generated across the resistor 38. The current ratio in each current mirror is assumed to be 1:1. Thus, a voltage (=VREG1−15×ΔV), which is obtained by subtracting the voltage drop "15×ΔV" from the reference voltage VREG1, is applied to the low pass filter 40.

As seen from the internal configuration shown in FIG. 2, the low pass filter 40 includes a resistor 41 provided between an input side and an output side, a capacitor 43 provided between the output side and ground (reference point), and a PNP 42 for charge discharging connected in parallel to the capacitor 43. The PNP 42 turns on when a voltage on the input side becomes lower than a voltage on the output side (charging voltage of the capacitor 43). In such a configuration, the resistor 41 and the capacitor 43 serve as a low pass filter, and when the voltage on the input side decreases, i.e. the output current Io increases, the PNP 42 turns on to discharge rapidly the charges in the capacitor 43. Thus, when the output current Io increases, the overcurrent detecting voltage Voc decreases without delay.

Referring to FIG. 3 which shows a current limit operation and FIG. 4 which shows the characteristic of an output voltage versus an output current, an explanation will be given of the operation of the switching power source apparatus according to this invention constructed described above.

During a normal operation, since the output current Io is smaller than a current to be limited, the overcurrent detecting voltage Voc is at a high value. The set voltage Vdm is also set at a high voltage. Therefore, the PMW comparator 25 generates the PWM signal on the basis of the comparison between the feedback voltage FB and the triangular wave signal Vtr. The first switch 11 and the second switch 12 are PWM-controlled by the gate driving signal P1 and the gate driving signal P2 generated on the basis of the PWM signal. Thus, the output voltage Vout is produced as a constant voltage corresponding to a prescribed set voltage.

With reference to FIGS. 3 and 4, this state represents that the overcurrent detecting voltage Voc is at a high value (leftward side in FIG. 3) and the output current Io is smaller than the current limitation starting current value Io1 at which the current limitation is started.

As the output current Io increases, as seen from FIG. 3, the detecting resistor voltage ΔV increases proportionately so that the overcurrent detecting voltage Voc falls. When the output current Io exceeds the current limitation starting current value Io1, the overcurrent detecting voltage Voc is lower than the feedback voltage FB, thereby starting the current limit operation.

This current limit operation is performed under the PWM control with the overcurrent detecting voltage Voc and the triangular wave signal Vtr, so that the dead time control (i.e. duty control) for the PWM signal is performed. The current limit operation by the PWM control, in which the circuit delay by a driver or the like does not affect the accuracy unlike the conventional pulse-by-pulse method, is subjected to the current limit with high accuracy. Further, the circuit elements such as the driver are not particularly required to perform the high speed operation, so that these circuit elements can be easily designed.

While this current limit operation is being performed, the constant voltage control operation is no longer performed. The output current in FIG. 4 is located in the current limit operation range, i.e. in the range between the current limitation starting current value Io1 and the output current maximum value Io2. The point (point S in FIG. 3) where the overcurrent detecting voltage Voc has reached the lower limit of the triangular wave Vtr corresponds to the output current maximum value Io2 in FIG. 4.

In the range where the current limit operation is performed, i.e. where the output current Io in FIG. 4 is located between the current limitation starting current value Io1 and the output current maximum value, the current limit operation is stably performed as a linear operation. The gradient α of the range where the current limit operation is performed can be adjusted by changing the multiplying factor (in this embodiment, "15") of the resistor 32 to the resistor 38.

Further, when the output current Io increases abruptly, the input side voltage of the low-pass filter 40 lowers correspondingly. The capacitor 43, which stores the charges corresponding to the output current Io before abrupt increase, is at a high voltage. At this time, a voltage is applied in a forward direction between the emitter and base of the PNP 42 so that the PNP 42 turns on. As a result, the charges stored in the capacitor 43 are discharged abruptly through the PNP 42.

Therefore, the overcurrent detecting voltage Voc responds to the abrupt increase in the output current Io at a high speed without substantial delay. Accordingly, because of provision of the low-pass filter 40, the overcurrent limit operation does not suffer from substantial delay.

According to the embodiment described above, since the dead time control (i.e. duty control) for the PWM control is performed by the overcurrent detecting voltage Voc which decreases as the output current Io increases, the current limit operation can be stabilized.

Since the affect of the circuit delay by a driver or the like can be decreased, the current limit operation can be performed with high accuracy. The delay time of the circuit elements such as the driver which gives the circuit delay is not required to be taken into consideration.

Further, since the overcurrent detecting voltage Voc is applied through the low-pass filter 40, the current limit operation can be further stabilized. In addition, the contrivance of the low-pass filter 40 in design can shorten the response delay for the overcurrent.

What is claimed is:

1. A switching power source apparatus comprising:
   a switching output circuit for outputting a DC output voltage converted from a DC power source voltage by a semiconductor switch which is on-off controlled;
   error amplifying means for comparing said DC output voltage with a reference voltage to generate a feedback signal which decreases as said DC output voltage increases;
   a current detecting circuit for detecting an output current flowing through said switching output circuit to generate a current detecting signal which decreases as said output current increase; and
   a PWM comparator, to which said feedback signal and said current detecting signal are inputted as comparison signals and a triangular wave signal is inputted as a reference signal, for comparing a lower signal of said comparison signals and said triangular wave signal to output a PWM signal,
   wherein said semiconductor switch is on-off controlled by said PWM signal and
   the current detecting circuit performs a straight current limit operation having a predetermined gradient while an output current is from a current limit operation starting current value to an output current maximum value, when the output current is beyond the current limit operation starting current value.

2. The switching power source apparatus according to claim 1,
   wherein said current detecting signal is outputted through a low-pass filter.

3. A switching power source apparatus comprising:
   a switching output circuit for outputting a DC output voltage converted from a DC power source voltage by a semiconductor switch which is on-off controlled;

error amplifying means for comparing said DC output voltage with a reference voltage to generate a feedback signal which decreases as said DC output voltage increases;

a current detecting circuit for detecting an output current flowing through said switching output circuit to generate a current detecting signal which decreases as said output current increase; and a PWM comparator, to which said feedback signal and said current detecting signal are inputted as comparison signals and a triangular wave signal is inputted as a reference signal, for comparing a lower signal of said comparison signals and said triangular wave signal to output a PWM signal, wherein said semiconductor switch is on-off controlled by said PWM signal and the current detecting circuit performs a straight current limit operation having a predetermined gradient while an output current is from a current limit operation starting current value to an output current maximum value, when the output current is beyond the current limit operation starting current value, said current detecting signal is outputted through a low-pass filter, and said low-pass filter includes:
- a resistor provided between an input side and an output side;
- a capacitor between said output side and a reference point; and
- a semiconductor switch for charge discharging, which is connected in parallel to said capacitor, to be turned on when a voltage on the input side becomes lower than a voltage on the output side.

* * * * *